United States Patent
Kikuchi et al.

[11] Patent Number: 6,167,184
[45] Date of Patent: Dec. 26, 2000

[54] OPTICAL FIBER FIXING DEVICE FOR OPTICALLY COUPLING OPTICAL FIBER WITH OPTICAL COMMUNICATION MODULE

[75] Inventors: Kimihiro Kikuchi; Yoshihiro Someno; Motohiko Otsuki, all of Miyagi-ken, Japan

[73] Assignee: Alps Electric Co., Ltd., Japan

[21] Appl. No.: 09/365,997

[22] Filed: Aug. 3, 1999

[30] Foreign Application Priority Data

Aug. 6, 1998 [JP] Japan .................................. 10-222747
Apr. 21, 1999 [JP] Japan .................................. 11-113034

[51] Int. Cl.⁷ ...................................................... G02B 6/00
[52] U.S. Cl. ........................... 385/137; 385/136; 385/53; 385/83
[58] Field of Search .................................. 385/136, 137, 385/53, 83

[56] References Cited

U.S. PATENT DOCUMENTS

| | | |
|---|---|---|
| 5,497,443 | 3/1996 | Jie et al. .................................. 385/134 |
| 5,638,482 | 6/1997 | Winterhoff et al. ..................... 385/136 |
| 5,668,906 | 9/1997 | Yamamura et al. ..................... 385/136 |
| 5,784,513 | 7/1998 | Kuribayashi et al. . |

*Primary Examiner*—Frank G. Font
*Assistant Examiner*—Reginald A. Ratliff
*Attorney, Agent, or Firm*—Brinks Hofer Gilson & Lione

[57] ABSTRACT

An insertion hole for inserting an optical fiber is formed at a case, and then a resilient leaf spring and an operating button are stored in the case. The leaf spring is comprised of a through-pass hole formed at the central part of the leaf spring in correspondence with the insertion hole, a plurality of resilient lock claws extended from the circumferential edge of the through-pass hole toward the center thereof, and a groove recessed from a part of the circumferential edge in an outward direction. The operating button is provided with a stem of which part can be fed into or out of the case, the stem abutted against both edges of the groove is pushed under an operation of the stem, thereby a held state of the lock claws against the optical fiber can be released indirectly.

5 Claims, 9 Drawing Sheets

LOCKED STATE

UNLOCKED STATE

FIG. 9C
LOCKED STATE

FIG. 10C
UNLOCKED STATE

FIG. 11
PRIOR ART

OPTICAL FIBER FIXING DEVICE FOR OPTICALLY COUPLING OPTICAL FIBER WITH OPTICAL COMMUNICATION MODULE

BACKGROUND OF THE INVENTION

1. Field of the Invention

The present invention relates to an optical fiber fixing device for optically coupling an optical fiber with an optical communication module.

2. Description of the Related Art

In general, the optical communication module is constructed such that a laser diode, a lens and an optical fiber are combined and integrally formed to each other, the laser beams radiated from the laser diode are collected through the lens and optically coupled within the optical fiber.

A system in which the optical fiber can be inserted into or removed from the main body of the optical communication module is called as a receptacle type.

Figure 11:
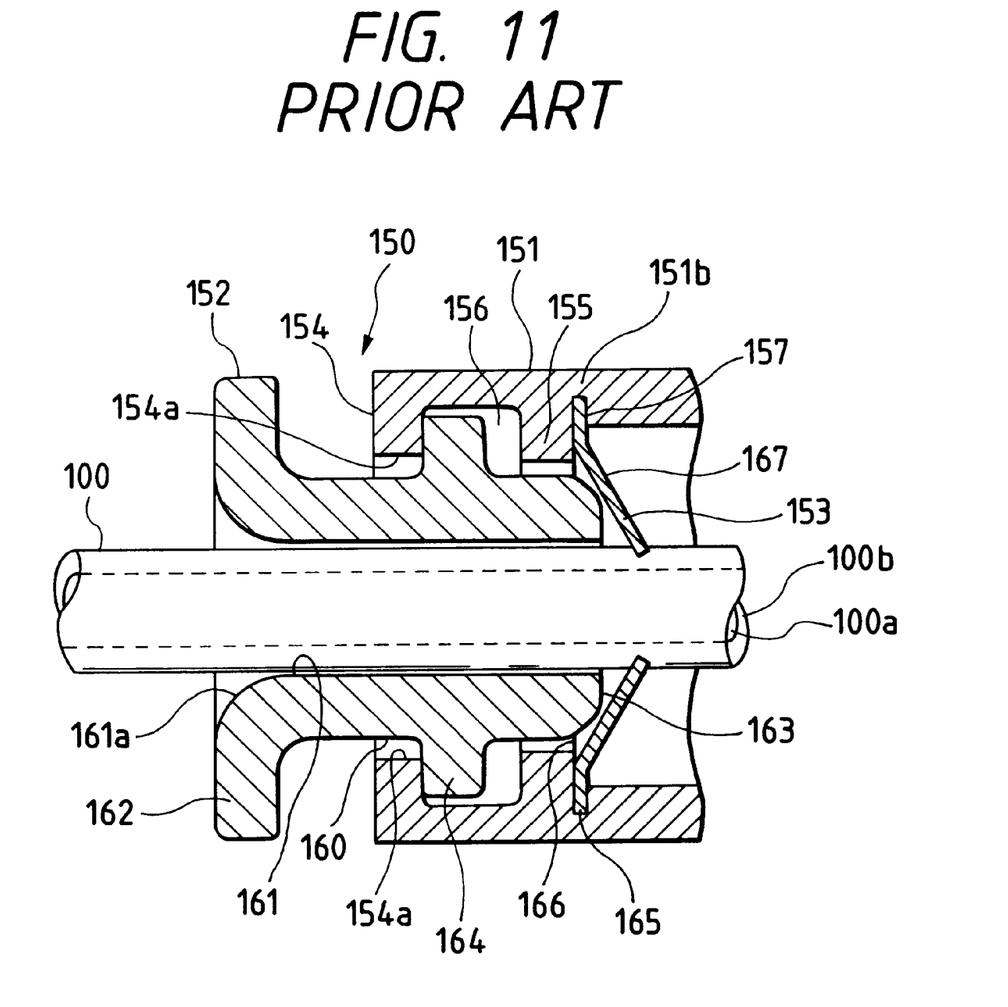
FIG. 11 is a partially sectional view for showing an optical fiber fixing device constituting the optical communication module in the prior art.

FIG. 11 is a partially sectional view for showing a configuration of an optical fiber fixing device 150 constituting the prior art optical communication module.

As shown in FIG. 11, the prior art optical fiber fixing device 150 is comprised of a cylindrical case 151, a substantially cylindrical sleeve 152 stored in the case 151 and a resilient metallic leaf spring 153.

The case 151 is provided with a front wall 154 having a circular fixing hole 154a. A side opposing against the front wall 154 of the case 151 is provided with a rear wall (not shown). In addition, the case 151 is provided with a side wall 151b connecting the front wall 154 with the rear wall.

The rear wall 151b is formed with an engaging step 155 projected inwardly between the front wall 154 and the rear wall at its inner circumferential surface. Then, the formation of the engaging step 155 causes a space between the front wall 154 and the engaging step 155 to become a space 156.

Then, at the root part of the engaging step 155 facing against a space opposite to the space 156 (the right side of the engaging step 155 shown in the figure) is formed a groove 157 extending along an inner circumferential surface of the side wall 151b.

A cylindrical sleeve 152 is formed with a fiber insertion hole 161 passing in the sleeve around its center. A part around the insertion hole 161 is applied as an external side wall 160 and its one end is formed with a flange-like knob 162 projected outwardly from the external side wall 160. In addition, the other end of it is formed with a metering section 163. Then, the end part of the knob section 162 of the external side wall 160 facing against the fiber insertion hole 161 is formed with a tapered part 161a.

A substantially central part between the knob 162 and the metering section 163 is formed with a stopper 164 protruded out of the external circumferential surface in an outward direction. Then, the sleeve 152 is stored in the case 151 and the knob 162 is protruded out of the fixing hole 154a of the case 151 in an outward direction.

At this time, the stopper 164 for the sleeve 152 is movably arranged and assembled within the space 156 between the front wall 154 and the engaging step 155.

The leaf spring 153 is comprised of a circular thin metallic base plate 165 and a substantially circular inner opening 166 recessed and formed at its central part. An edge part of the inner opening 166 of the base plate 165 is formed with a plurality of tongue-like resilient lock claws 167 formed to be extended inwardly.

These lock claws 167 are formed with their sectional surfaces being bent from the edge of the inner opening 166 at the base plate 165 on a plane of the base plate in the figure. On the other hand, the extremity end of each of the lock claws 167 is formed such that its sectional surface in a direction of plate thickness may form an acute angle.

Then, an entire circumferential edge of the base plate 165 at the leaf spring 153 is fitted to the groove 157 of the case 151, fitted and fixed there. At this time, the lock claw 167 is bent at its root part to face from the part of the inner opening 166 of the base plate 165 toward a side opposite to the front wall 154.

Next, the optical fiber 100 is comprised of a core 100a made of optical wave guide of glass or plastic material and the like and a clad 100b covering the core 100a with resin. Then, the optical fiber 100 is arranged within the sleeve 152 of the case 151. At the end part of the optical fiber 100 is arranged a laser diode (not shown) or the like. Then, the laser beam is incident from this laser diode to the end part of this optical fiber 100.

Then, a method for fixing the optical fiber 100 to the optical fiber fixing device 150 constructed as described above will be described as follows.

When the optical fiber 100 is inserted into the sleeve 152 from outside with the tapered portion 161a being applied as a guide, the optical fiber advances forward with its position being restricted by the fiber insertion hole 161, the extremity end of each of the lock claws 167 is pushed out in an inserting direction, a clearance between each of the extremity ends is widened and the optical fiber 100 is inserted smoothly into the case 151 while it is being abutted against the outer circumferential surface of the covering section 100b of the optical fiber 100.

Then, the covering part 100b of the optical fiber 100 is resiliently pushed by the extremity end of the lock claw 167.

However, in the case that a pulling-out force is applied to the optical fiber 100, i.e. a force for pulling out the optical fiber 100 from the case 151 is applied to the optical fiber 100, the extremity end of the stopper piece 167 formed in an acute angle bites into the outer circumferential surface of the covering part 100b so as to prevent the optical fiber from being pulled out of it.

With such an arrangement as above, laser beam incident to one end of the core 100a of the optical fiber 100 from the laser diode is transmitted within the core 100a and is outputted at the other end thereof.

Then, when the optical fiber 100 installed at the case 151 is to be removed from it, the sleeve 152 is pushed within the fixing hole 154a in a direction opposite to its pulling-out direction. That is, the knob 162 is held in such a way that it can be pushed against the optical fiber 100 in a direction parallel to it and then it is pushed until the stopper 164 abuts against the engaging step 155. A metered part 163 formed at the extremity end of the sleeve 152 pushes wide the extremity end of each of the lock claws 167 and a fitted state of the extremity end of the lock claw 167 into the covering part 100b of the optical fiber 100 and its held state are released. In this way, it is possible that the optical fiber 100 is pulled out of the case 151 under a state in which the sleeve 152 is being pushed into the case 151.

However, there was a problem in the prior art optical communication module that it was necessary to arrange a space section for the sleeve 152 moved in an inserting or removing direction of the optical fiber 100 within the case 151, a thickness of the sleeve 152 in this direction as well as a length of the sleeve 152 by itself could not be ignored, resulting in that its thin and small-sized arrangement was made difficult.

SUMMARY OF THE INVENTION

The present invention has been invented in reference to the aforesaid problems and it is an object of the present invention to provide an optical fiber fixing device in which a thickness of the case in respect to an inserting and pulling-out direction of the optical fiber is made thin to form a small-sized and thin type device.

As a first arrangement for solving the aforesaid problems, the front wall of the case provided with a cavity is formed with an insertion hole, a movable leaf spring is stored in the cavity, the leaf spring has a through-pass hole and a recess groove recessed to reach the through-pass hole, the circumferential edge of the through-pass hole is formed with a plurality of lock claws, an optical fiber is inserted through the insertion hole and the through-pass hole of the leaf spring, the claws are engaged with the optical fiber, an operating part arranged to deform the recess groove is operated to release an engagement between the optical fiber and the lock claws.

In addition, as a second arrangement for solving the aforesaid problems, the recess groove is comprised of a first recess groove and a second recess groove, these first and second recess grooves are oppositely arranged to each other with the through-pass hole being held therebetween.

Further, as a third arrangement for solving the aforesaid problems, the case is provided with an abutting part faced against the cavity, the leaf spring is pushed against the abutting part to expand the recess groove.

In addition, as a fourth arrangement for solving the aforesaid problems, the operating part is made such that a part of the leaf spring is fed out of the case.

Further, as a fifth arrangement for solving the aforesaid problems, the operating part is comprised of an operating button movably attached to the case.

DESCRIPTION OF THE PREFERRED EMBODIMENTS

Referring to the drawings, a first preferred embodiment of the present invention will be described as follows.

Figure 1:
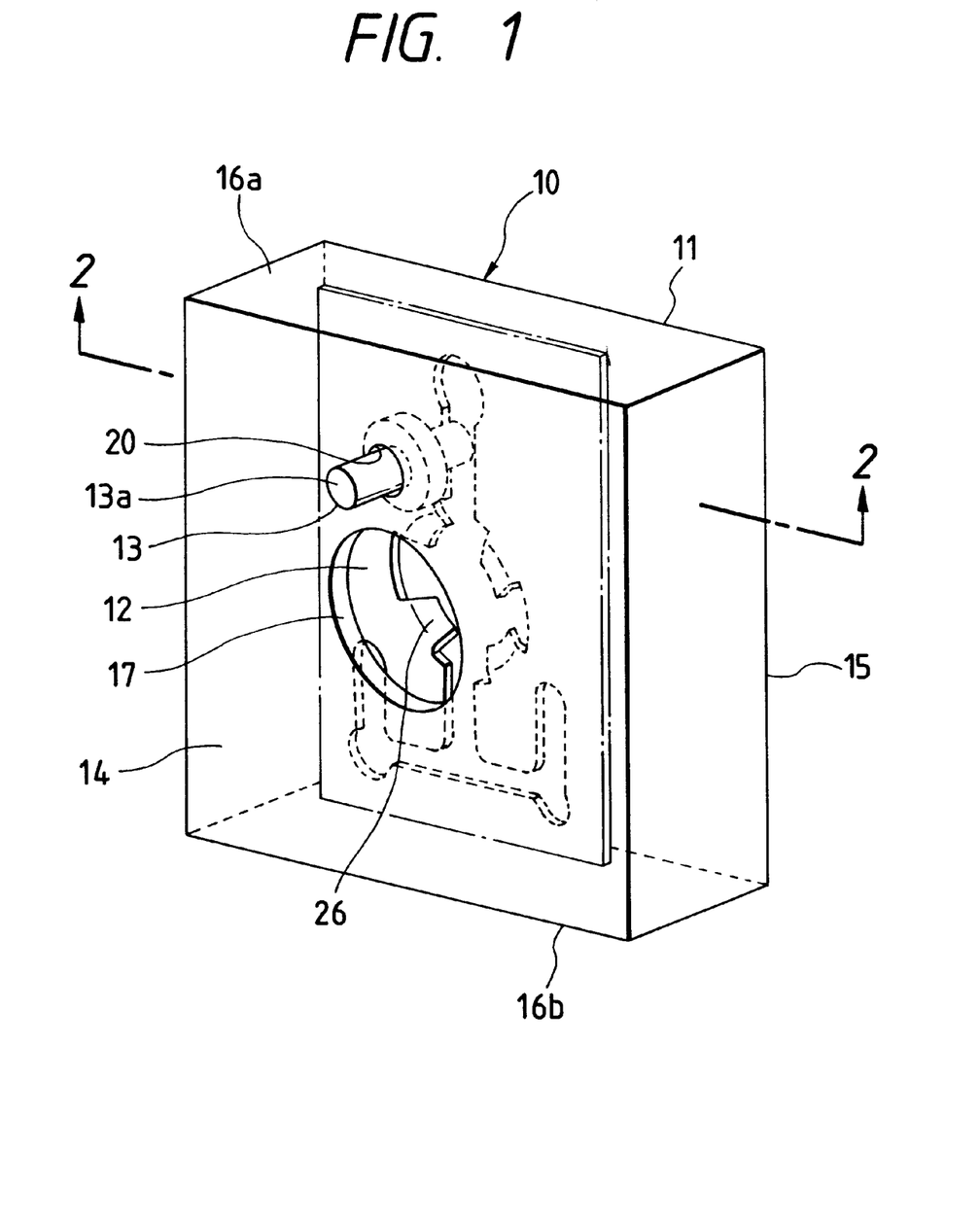
FIG. 1 is a perspective view for showing a schematic configuration of an optical fiber fixing device of a first preferred embodiment of the present invention.
Figure 2:
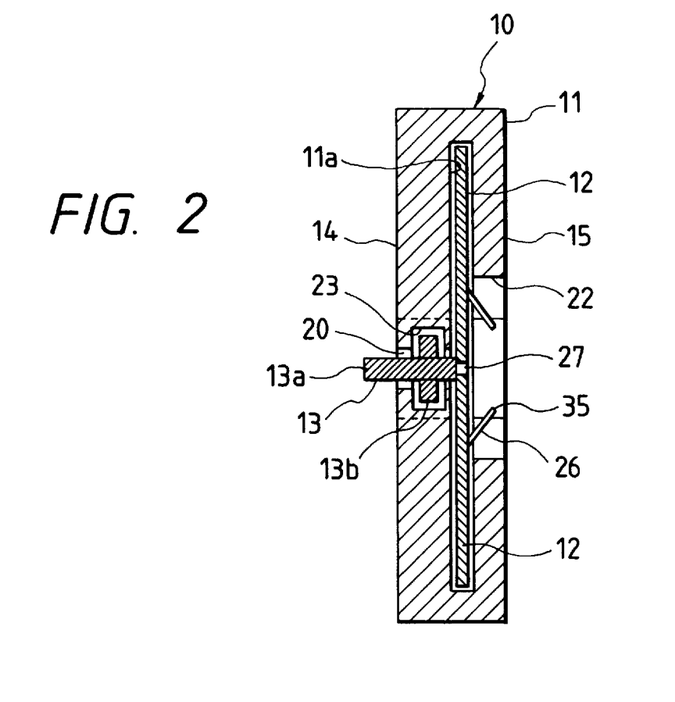
FIG. 2 is a sectional view taken along a line 2—2 of the optical fiber fixing device as viewed from its arrow direction.

FIG. 1 is a perspective view for showing a schematic configuration of an optical fiber fixing device 10 of a first preferred embodiment of the present invention. FIG. 2 is a sectional view taken along a line 2—2 of the optical fiber fixing device 10 in FIG. 1 as viewed from its arrow direction.

As shown in FIGS. 1 and 2, the optical fiber fixing device 10 is provided with a substantially rectangular case 11 formed by a metal of relative thin thickness or resin showing a high rigidity, a metallic thin leaf spring 12 having a rectangular shape, an operating button 13 abutted against this leaf spring 12 is attached to it and fixed to it.

The case 11 is provided with a wide and flat front wall 14 (at the front side in FIG. 1). Further, there is provided a rear wall 15 (at a rear side in FIG. 1) at its rear surface in opposition to the front wall 14.

There is provided each of a first side wall 16a and a second side wall 16b in an upward or downward direction of the four surfaces connecting the parallel front wall 14 and rear wall 15, respectively.

The case 11 is provided with, at its inner side, a rectangular-shaped wide cavity 11a in such a way that its wide part may become in parallel with the front wall 14 and the rear wall 15.

An insertion hole 17 for the optical fiber is punched out and formed in a circular shape at the central part of the front wall 14.

Further, a smaller circular fixing hole 20 than the insertion hole 17 is passed and formed at the front wall 14 in such a way that it may be positioned between the insertion hole 17 and the first side wall 16a.

A column-like space 23 having a larger diameter than that of the fixing hole 20 is formed at a central part (within a plate thickness of the front wall 14) of the fixing hole 20. Further, it is available that the space 23 is formed to be directly faced (exposed) against the cavity 11a.

On the other hand, the rear wall 15 is formed with a substantially circular opening 22 at the central part of it in such a way that the opening may be oppositely faced against the insertion hole 17 of the front wall 14.

Figure 3:
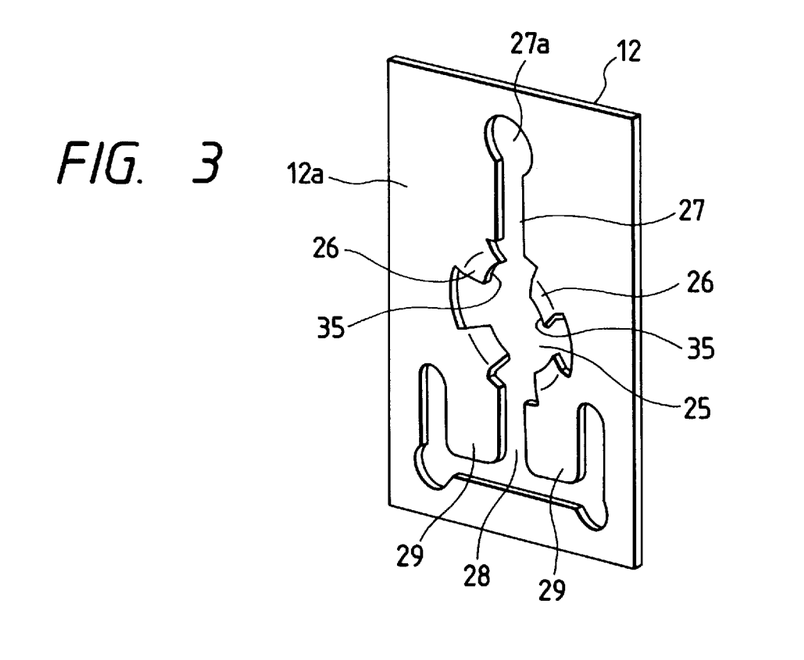
FIG. 3 is a perspective view for showing a leaf spring constituting the optical fiber fixing device of the first preferred embodiment of the present invention.

FIG. 3 is a perspective view for showing the leaf spring 12 constituting the optical fiber fixing device 10.

As shown in FIG. 3, the leaf spring 12 is made such that a metallic plate member made of stainless steel or phosphor bronze is formed to have a resiliency.

The leaf spring 12 is formed with a base plate 12a and a through-pass hole 25 punched at its central part and formed in a circular shape. Four tongue-like resilient lock claws 26 extended and arranged inwardly are equally spaced apart at an edge part of the base plate 12a at the through-pass hole 25.

These lock claws 26 are bent and formed on the surface of the base plate 12a from the edge part of the through-pass hole 25 in the base plate 12a at their sectional surfaces as viewed in the figure. On the other hand, the extremity end 35 of the lock claw 26 is crushed and formed in such a way that a sectional area in its plate thickness direction may become an acute angle.

In addition, the leaf spring 12 is formed with a first recess groove 27 recessed in a linear shape so as to reach the upper part of the through-pass hole 25 and a second recess groove 28 recessed in an angular-shape so as to reach the lower part of the through-pass hole 25, respectively.

Then, the leaf spring 12 may easily be flexed by the first and second recess grooves 27, 28, respectively.

In order to fix the leaf spring 12 constructed as described above in the cavity 11a of the case 11 as shown in FIG. 2, it may be stored in the cavity 11a in such a way that the lock claws 26 of the leaf spring 12 may be arranged in the space of the opening 22 of the rear wall 15 and also in such a way that the first recess groove 27 may become a side of the first side wall 16a and the second recess groove 28 may become a side of the second side wall 16b, respectively.

Next, as shown in FIGS. 1 and 2, the operating button 13 made of resin is comprised of a column-like stem 13a and a column-like flange 13b having the stem 13a as its axial center. Then, the operating button 13 is inserted into the fixing hole 20 of the case 11 and fixed and supported in such a way that the flange 13b of the operating button 13 is arranged in the space 23. One end of the stem 13a is projected out of the front wall 14, the other end of it is abutted against the first recess groove 27 of the leaf spring 12 and then the leaf spring 12 is flexed by pushing the operating button 13.

Then, the flange 13a is always biased by a spring (not shown) in the space 23 toward the front wall 14.

It may also be applicable that the aforesaid operating button 13 is integrally formed with the leaf spring 12 and no spring (not shown) is applied.

Further, a main body of the optical communication module (not shown) is fixed to the rear wall 15 of the case 11, and the laser diode (not shown) constituting this optical communication module is arranged on an extending line toward the deep side (the right side as viewed in FIG. 2) of the central axis of the opening 22.

A method for fixing the optical fiber 100 to the optical fiber fixing device 10 constructed as described above will be described as follows.

Figure 4A:
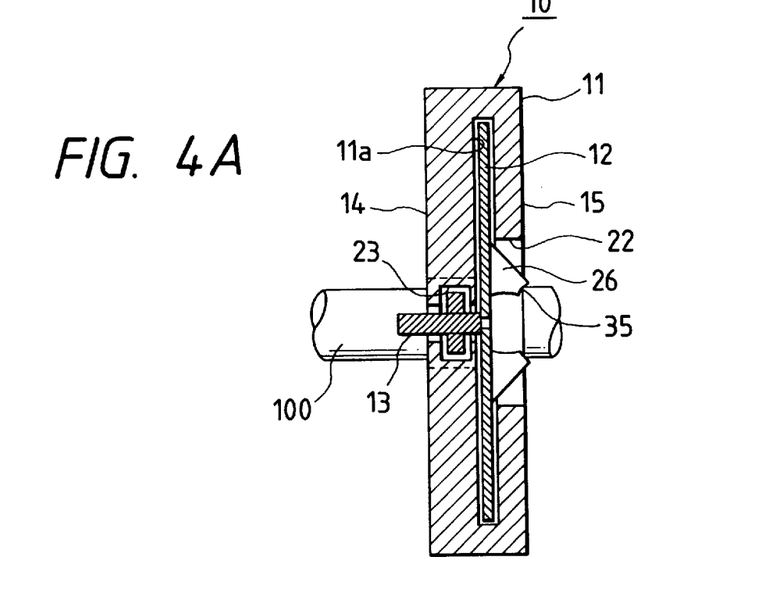
FIG. 4A is a sectional view taken along a sectional direction in FIG. 2 for showing a state in which an optical fiber is fixed to the optical fiber fixing device of the first preferred embodiment of the present invention.
Figure 4B:
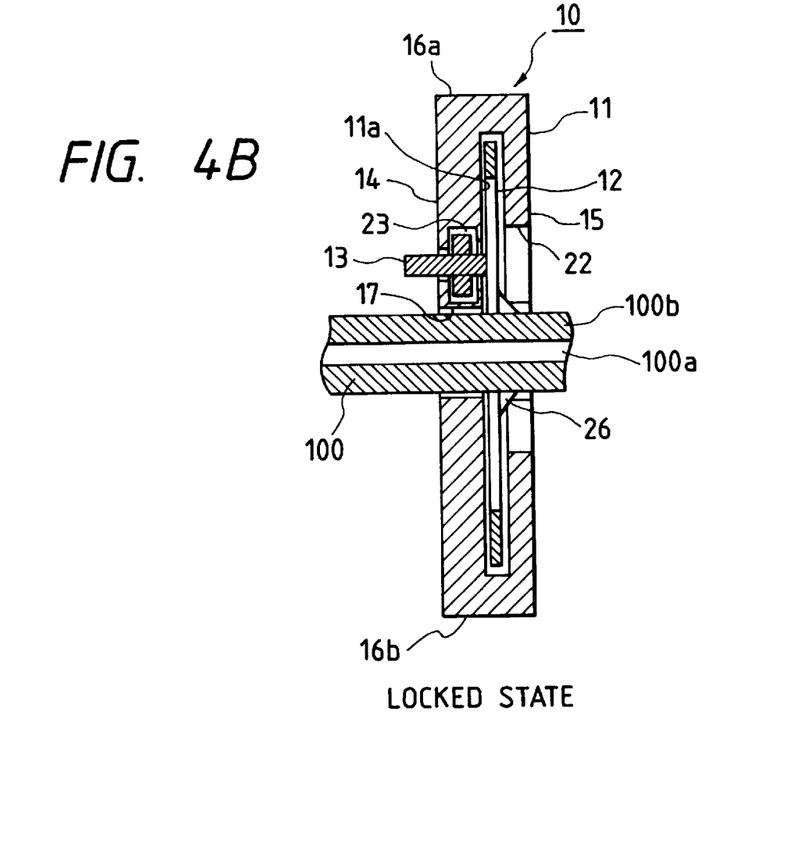
FIG. 4B is a longitudinal sectional view for showing a fixing part of the optical fiber under the state shown in FIG. 4A.

FIG. 4A is a sectional view taken along a line 2—2 in FIG. 2 from an arrow direction for showing a state in which an optical fiber 100 is fixed to the optical fiber fixing device 10, and FIG. 4B is a longitudinal sectional view for showing an optical fiber fixing device 10 in FIG. 1.

As shown in FIGS. 4A and 4B, when the optical fiber 100 is inserted from outside into the insertion hole 17 of the case 11, the extremity end 35 of the lock claw 26 of the leaf spring 12 stored in the cavity 11a of the case 11 may accept a force to cause the extremity end 35 to be bent toward an inserting direction of the optical fiber 100 as the optical fiber 100 is inserted, and then the extremity end 35 is pushed out in an inserting direction of the optical fiber 100 and a clearance between each of the extremity ends 35 is expanded. The extremity end 35 slides at the outer circumferential surface of the covering part 100b of the optical fiber 100 to cause the optical fiber 100 to be smoothly inserted into the case 11.

Then, one end of the optical fiber 100 is fitted to a predetermined position (not shown), insertion of the optical fiber 100 into the case 11 is stopped and the covering part 100b of the optical fiber 100 is resiliently pushed by the extremity end 35 of the lock claw 26.

Next, when a pulling-out force is applied to the optical fiber 100, i.e. a force for pulling out the optical fiber 100 from the case 11, the extremity end 35 of the lock claw 26 holding the outer circumferential surface of the covering section 100b of the optical fiber 100 in a slant manner bites into the outer circumferential surface of the covering section 100b against the pulling-out force to prevent the optical fiber 100 from being pulled out.

Accordingly, the optical fiber 100 is held by the leaf spring 12 and attached and fixed positively within the case 11.

Further, in this type of optical fiber 100, it is possible to perform a positive attaching and fixing of the optical fiber even under a state in which a thickness of the optical fiber 100 in its inserting direction is kept thin under holding of these plurality of lock claws 26.

Under the fixing of the optical fiber 100 to the optical fiber fixing device 10, a laser beam incident from a laser diode (not shown) to one end (the right side in the figure) of the core 100a of the optical fiber 100 is transferred within the core 100a and outputted from the other end (the left side in the figure).

Next, a method for removing the optical fiber 100 installed and held at the optical fiber fixing device 10 will be described as follows.

Figure 5A:
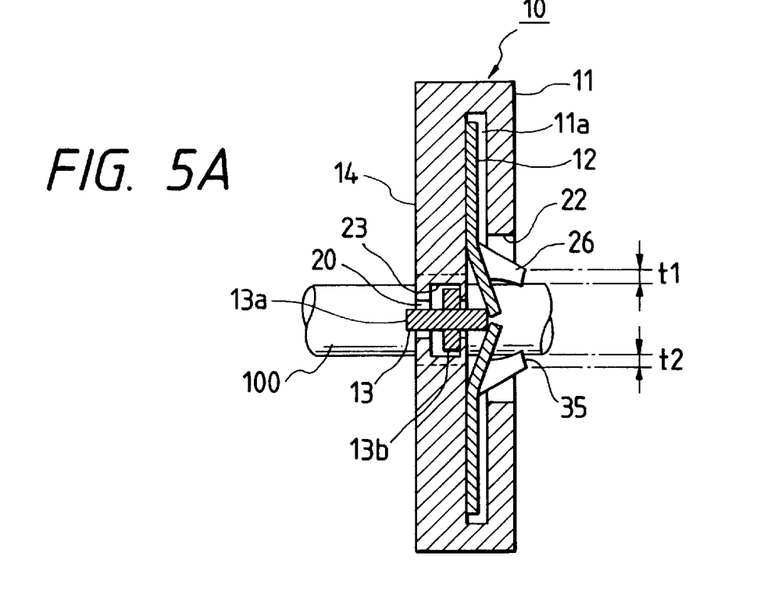
FIG. 5A is a sectional view viewed from a sectional direction in FIG. 2 for showing an operating state in which an optical fiber is removed from the optical fiber fixing device of the first preferred embodiment of the present invention.
Figure 5B:
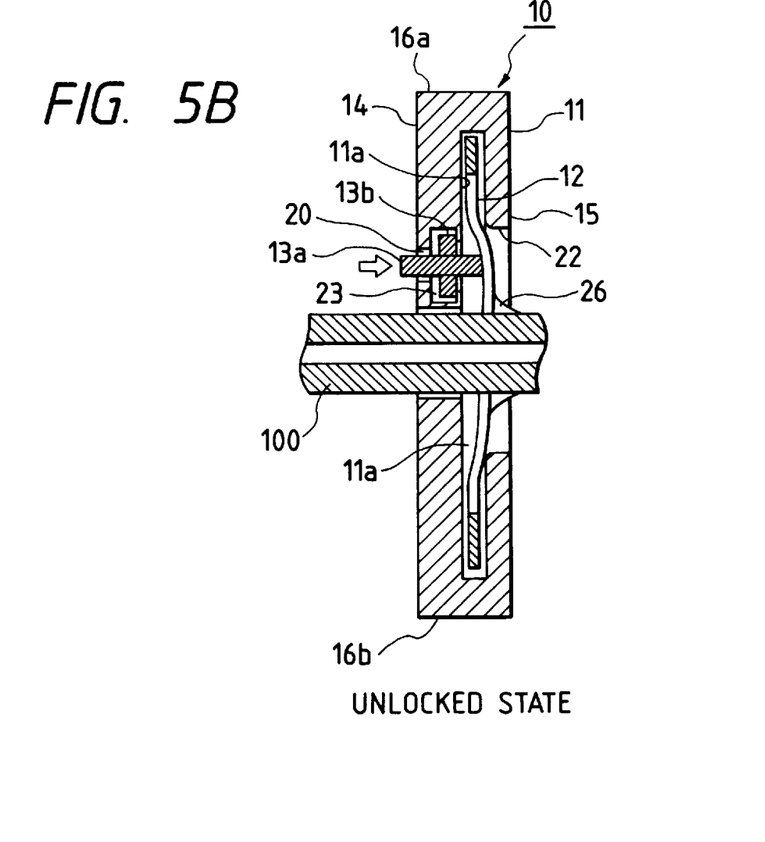
FIG. 5B is a longitudinal sectional view for showing a fixing part of the optical fiber under the operating state shown in FIG. 5A.

FIG. 5A is a sectional view taken along a line 2—2 in FIG. 1 from an arrow direction in FIG. 1 for showing an operating state in which the optical fiber 100 is removed, and FIG. 5B is a longitudinal sectional view for showing the operating state shown in FIG. 5A.

As shown in FIGS. 5A and 5B, when the optical fiber 100 is removed from the case 11, the stem 13a of the operating button 13 is pushed into the case 11 to perform a removing operation.

That is, when one end of the stem 13a projected out of the fixing hole 20 at the front wall 14 is pushed, the flange 13b arranged in the space 23 is moved against a spring (not shown) and the other end of the stem 13a is projected out of the fixing hole 20 into the cavity 11a. Then, the other end of the stem 13a is forcedly contacted with the first recess groove 27 of the leaf spring 12.

Then, the first recess groove 27 is flexed and pushed wide in an outward direction. As a result, the four lock claws 26 of the leaf spring 12 communicated with the first recess groove 27 are flexed concurrently by this flexing force, bite into the covering section 100b of the optical fiber 100, or each of the extremity ends 35 of the lock claws 26 forcedly contacted and held is widened and released (t1 and t2 in the figure). Then, the flange 13b is abutted against the right wall in the space 23 and stopped there.

It is possible to remove the optical fiber 100 from the case 11 by pulling out the optical fiber 100 under a state in which the lock claws 26 are being released.

With such an arrangement as above, since an acting point of the operating button 13 against the leaf spring 12 is placed at the first recess groove 27 near a flexing supporting point of the entire leaf spring 12 as compared with the lock claws 26, the lock claws 26 can be flexed wide even against a slight flexing amount of the first recess groove 27. Accordingly, a moving amount of the operating button 13 is low, a small-sized operating button 13 can be attained and also its releasing operation is easily carried out. Further, it is not necessary to cause the optical fiber 100 to pass through it as found in the prior art operating button (sleeve 52) and a shape of the operating button 13 can be simplified.

That is, a thickness width of the case 11 in an inserting direction and a pulling-out direction of the optical fiber 100 caused by a laser diode arranged on an axial extending line of the core 100a of the optical fiber 100 attached to and fixed to the device 10, its terminal and a circuit board or the like can be made thin due to the fact that a thickness of the sleeve 52 by itself and a thickness of the case 11 for use in fixing the sleeve 52 as found in the prior art can be eliminated.

Then, when the optical fiber 100 is released from the lock claws 26, it is not necessary to apply any special skill and further it is possible to eliminate any lock releasing member having complex shape.

Next, referring to the drawings, a second preferred embodiment of the present invention will be described as follows.

Figure 6:
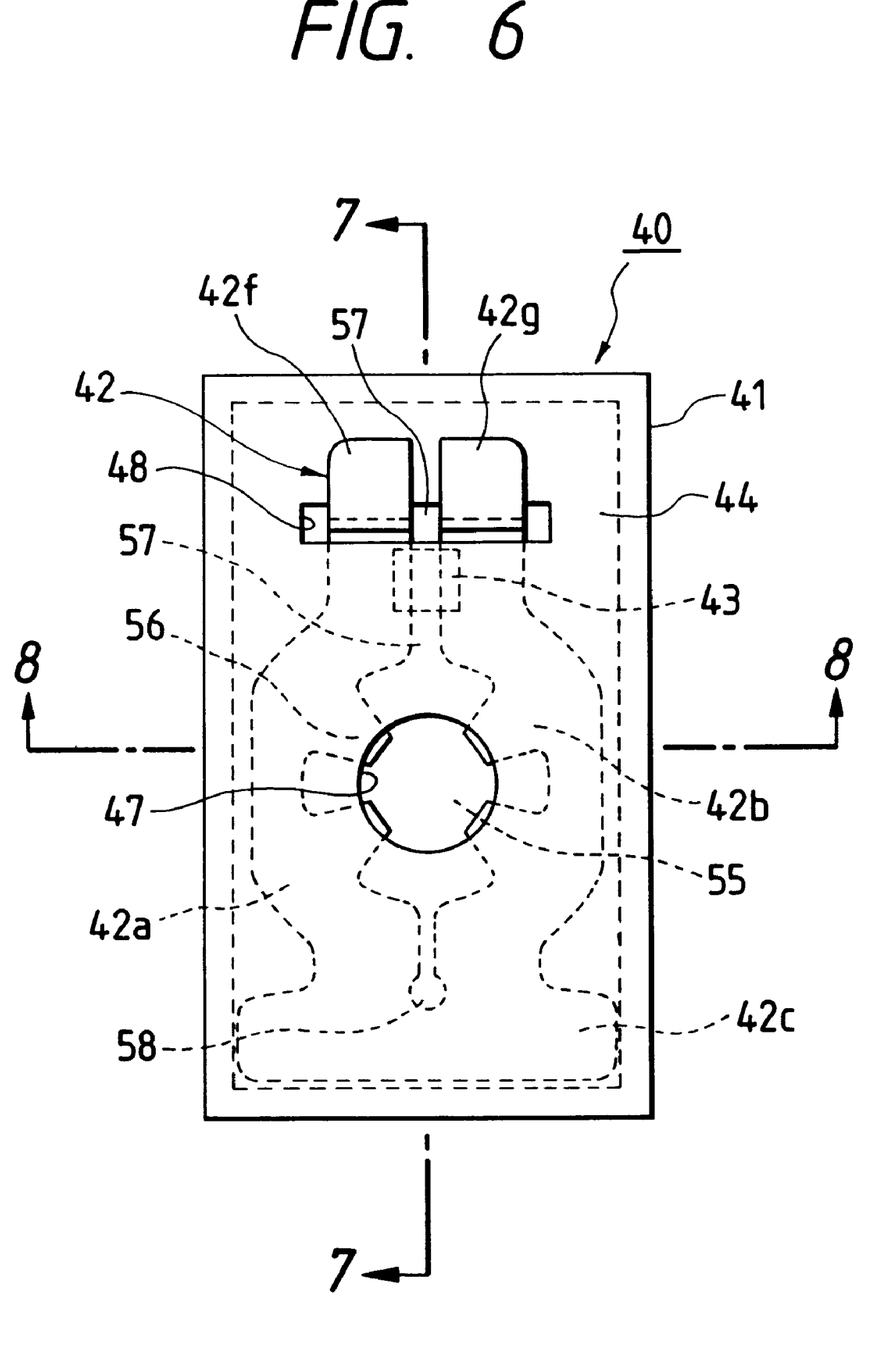
FIG. 6 is a front elevational view for showing a schematic configuration of an optical fiber fixing device of a second preferred embodiment of the present invention.
Figure 7:
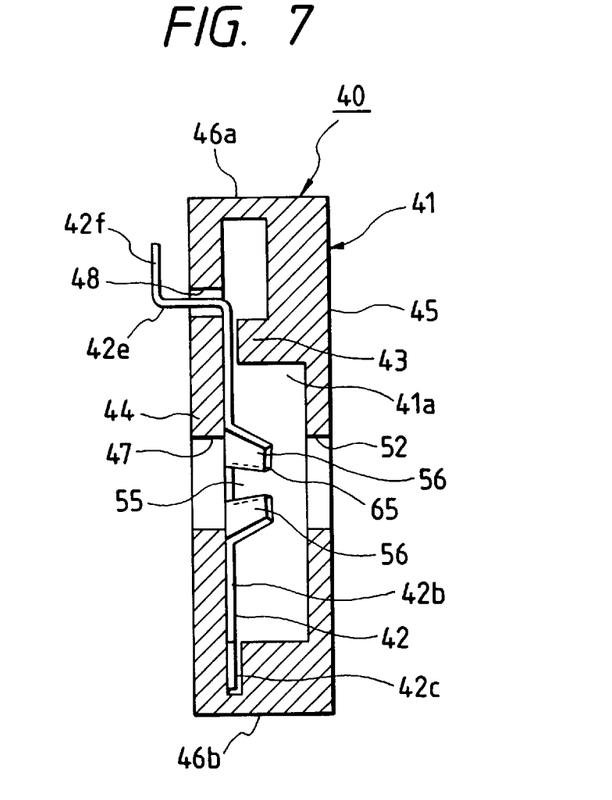
FIG. 7 is a sectional view taken along a line 7—7 of the optical fiber fixing device as viewed from its arrow direction.
Figure 8:
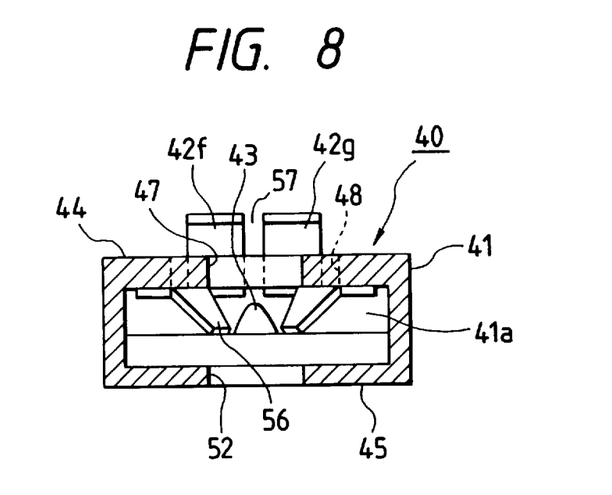
FIG. 8 is a sectional view taken along a line 8—8 of the optical fiber fixing device in FIG. 6 as viewed from its arrow direction.
Figure 9A:
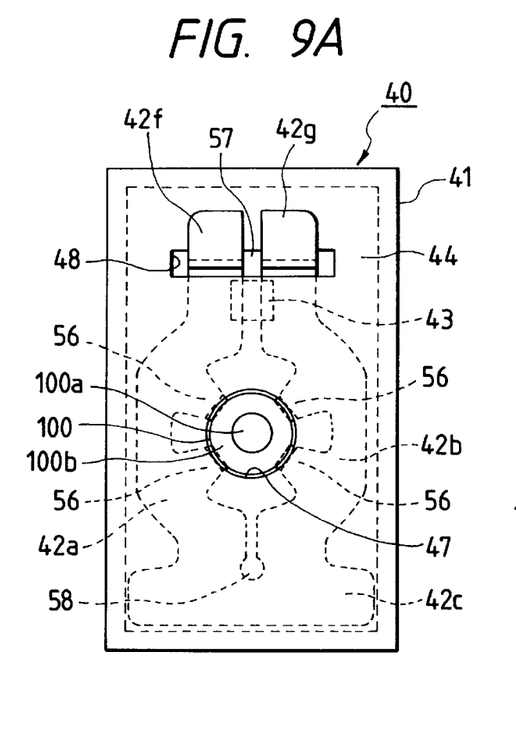
FIG. 9A is a front elevational view for showing an operating state in which an optical fiber is fixed to the optical fiber fixing device of the second preferred embodiment of the present invention.
Figure 9B:
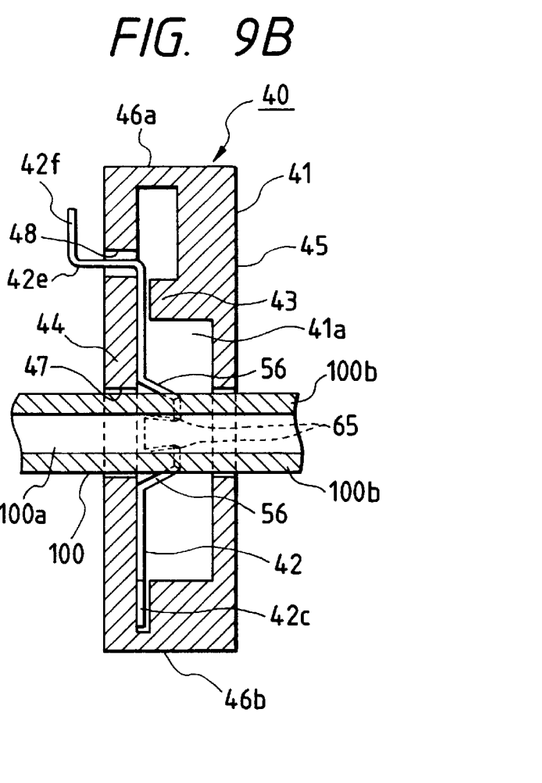
FIG. 9B is a longitudinal sectional view of FIG. 9A.
Figure 9C:
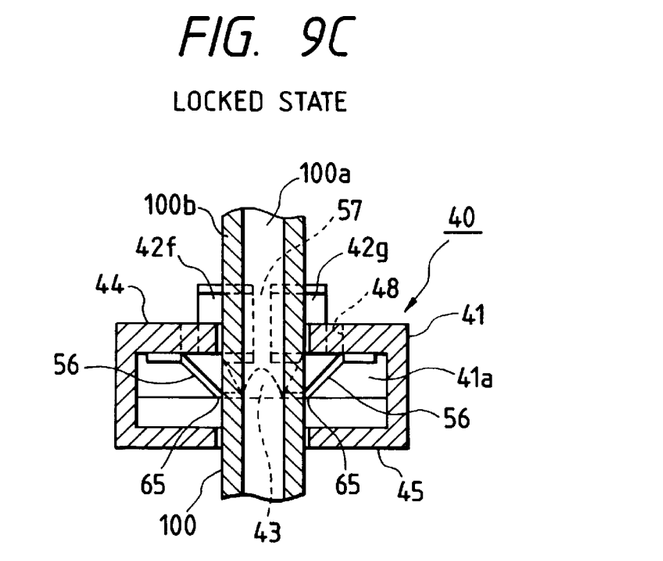
FIG. 9C is a cross sectional view of FIG. 9A.
Figure 10A:
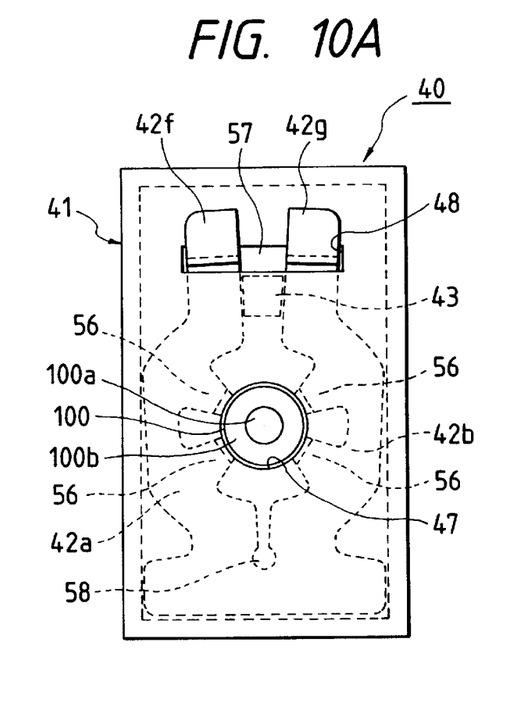
FIG. 10A is a front elevational view for showing an operating state in which an optical fiber is removed from the optical fiber fixing device of the second preferred embodiment of the present invention.
Figure 10B:
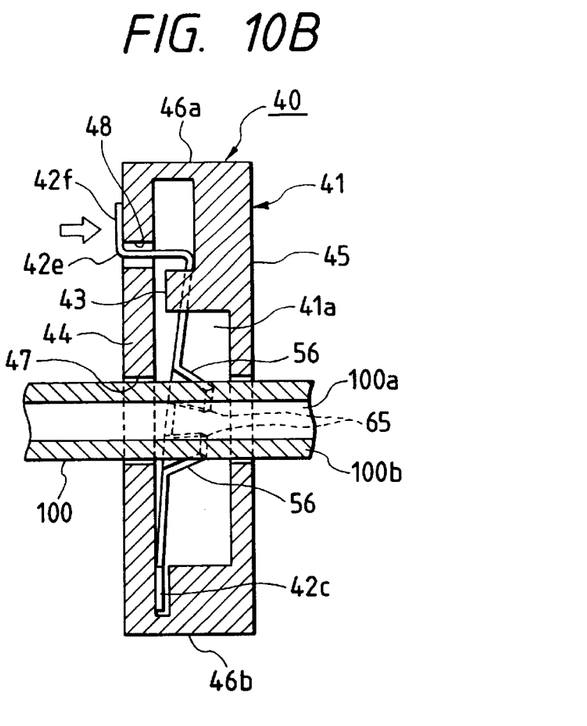
FIG. 10B is a longitudinal sectional view of FIG. 10A.
Figure 10C:
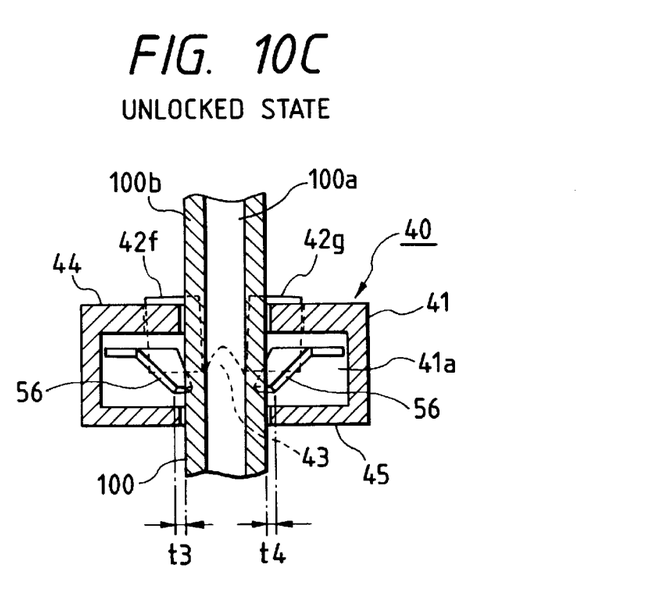
FIG. 10C is a cross sectional view of FIG. 10A.

FIG. 6 is a front elevational view for showing a schematic configuration of an optical fiber fixing device 40 of an optical communication module. FIG. 7 is a sectional view taken along a line 7—7 of the optical fiber fixing device 40 as viewed from its arrow direction. FIG. 8 is a sectional view taken along a line 8—8 of the optical fiber fixing device 40 in FIG. 6 as viewed from its arrow direction. FIGS. 9A to 9C are views for showing states in which the optical fiber is inserted into the optical fiber fixing device 40 and locked there, wherein FIG. 9A is a front elevational view, FIG. 9B is a longitudinal sectional view and FIG. 9C is a cross sectional view, respectively. FIGS. 10A to 10C are views for showing the states in which the locked state is released in the optical fiber fixing device 40 having the optical fiber inserted therein, wherein FIG. 10A is a front elevational view, FIG. 10B is a longitudinal sectional view and FIG. 10C is a cross sectional view, respectively.

As shown in FIGS. 6 to 10, the optical fiber fixing device 40 is provided with a substantially rectangular case 41 made of metal having a relative thin thickness or resin having a high rigidity, and the case 41 has a cavity 41a in it.

This case 41 is made such that a flat wide front wall 44 is arranged at an operator's side as viewed in FIG. 6 and then the rear wall 45 (the right side in FIG. 7) is arranged at the rear surface thereof in opposition to the front wall 44.

There are provided a first side wall 46a and a second side wall 46b extending in an upward or downward direction of the four surfaces connecting the parallel front wall 44 and rear wall 45, respectively.

An insertion hole 47 for the optical fiber is punched in a circular shape and formed at the central part of the front wall 44. Further, the central part of the front wall 44 is provided with a smaller rectangular fixing hole 48 than the insertion hole 47 in such a way that it may be positioned between the insertion hole 47 and the first side wall 46a.

A protrusion (abutting section) 43 having a substantially angular-shaped sectional shape projecting from the inner wall of the rear wall 45 toward the inner wall of the front wall 44 is integrally attached to and fixed to its inner wall of the cavity 41a of the case 41.

A substantially circular-shaped opening 52 formed at the central part of the rear wall 45 is formed at the rear wall 45 in opposition to the insertion hole 47 of the front wall 44.

The leaf spring 42 is formed such that a metallic plate member made of stainless steel or phosphorous bronze is formed to have a certain resiliency and the leaf spring is comprised of a pair of base plate pieces 42a, 42b; a substantially circular through-pass hole 55 punched and formed at the central part of each of the base plate pieces 42a, 42b; a wide width part 42c connecting one end of each of the base plate pieces 42a, 42b to each other and having a wider width than those of the remaining portions; a pair of bending sections 42d, 42e formed by bending the other ends of the base plate pieces; and operating sections 42f, 42g arranged at the extremity ends of these bent sections 42d, 42e.

Then, the leaf spring 42 has, between a pair of bent sections 42d, 42e, a first recess groove 57 communicated with the through-pass hole 55 and recessed to be formed in a linear shape; and a second recess groove 58 recessed to be formed in a linear shape to reach the through-pass hole 55 from below.

In this way, the leaf spring 42 is easily flexed under an arrangement of the first and second recess grooves 57, 58.

Four tongue-shaped resilient lock claws 56 extending inwardly are equally spaced apart at a circumferential edge of the through-pass hole 55 of the base plate pieces 42a, 42b.

These lock claws 56 are bent and formed on the base plate piece 42a from the edge part of the through-pass hole 55 of the base plate piece 42a. On the other hand, the extremity end 65 of the lock claw 56 is formed by a crushing work in such a way that a sectional surface in a plate thickness direction may show an acute angle.

As shown in FIG. 7, such a leaf spring 42 as described above is stored in the cavity 41a such that the lock claw 56 is arranged in the insertion hole 47 of the front wall 44 and the opening 52 of the rear wall 45, or the first recess groove 57 is placed at the first side wall 46a of the case 41 and the second recess groove 58 is placed at the second side wall 46b of the case 41.

In addition, the operating sections 42f, 42g acting as extremity ends of the bent sections 42d, 42e of the leaf spring 42 are projected out of the fixing hole 48 of the case 41 in an outward direction. Further, the wide width part 42c is inserted into the lower groove in the cavity 41a, attached and fixed there.

Additionally, the part of the first recess groove 57 of the bent sections 42d, 42e of the leaf spring 42 is oppositely faced against the protrusion 43 of the rear wall 45 acting as the abutted part.

Referring to FIGS. 9A to 9C, a method for fixing the optical fiber 100 to the optical fiber fixing device 40 constructed as described above will be described as follows.

As shown in FIGS. 9A to 9C, when the optical fiber 100 is inserted into the insertion hole 47 of the case 41 from outside, the lock claws 56 of the leaf spring 42 stored in the cavity 41a of the case 41 may accept a force in which their extremity ends 65 are bent in an inserting direction of the optical fiber 100, resulting in that the extremity ends 65 are pushed out toward an inserting direction of the optical fiber 100 to cause a clearance between each of the extremity ends 65 to be widened. The extremity ends 65 slide on the outer circumferential surface of the covering part 100b of the optical fiber 100 to cause the optical fiber 100 to be smoothly inserted into the case 41.

Then, one end of the optical fiber 100 is fitted at a predetermined position (not shown) and insertion of the optical fiber 100 into the case 41 is terminated and the covering part 100b of the optical fiber 100 is resiliently pressed by the extremity ends 65 of the lock claws 56.

Next, when a pulling-out force is applied to the optical fiber 100, i.e. when a force for pulling out the optical fiber 100 from the case 41 is applied, the extremity ends 65 of the lock claws 56 holding in a slant manner the outer circumferential surface of the covering part 100b of the optical fiber 100 bite into the outer circumferential surface of the covering part 100b against its pulling-out force so as to prevent the optical fiber 100 from being pulled out of it.

Thus, the optical fiber 100 is held by the leaf spring 42 and positively attached and fixed in the case 41.

In this way, the optical fiber 100 is fixed to the optical fiber fixing device 40 to cause the laser beam incident to one end of the core 100a of the optical fiber (the left side as viewed in FIG. 9B) from the laser diode (not shown) to be transmitted within the core 100a and outputted at the other end (the right side as viewed in the figure).

Next, referring to FIGS. 10A to 10C, a method for taking out the optical fiber 100 installed and held at the optical fiber fixing device 40 will be described as follows.

As shown in FIGS. 10A to 10C, in the case that the optical fiber 100 is taken out of the case 41, the operating sections 42f, 42g are pushed into the case 41 (a direction of arrow in FIG. 10B).

This pushing-in operation causes the entire leaf spring 42 to be flexed around a fulcrum point of the groove part of the case 41 fitted to the wide width part 42c and further the bent sections 42d, 42e accepting the pushing force to be moved in the cavity 41a from the front wall 44 of the case 41 to the rear wall 45 of it. At that time, the part of the first recess groove 57 at the bent sections 42d, 42e strikes against a protrusion 43 projected into the cavity 41a and then the bent sections 42d, 42e are moved in such a direction as one in which the width of the first recess groove 57 is largely widened. As a result, the four lock claws 56 of the leaf spring 42 communicated with the bent sections 42d, 42e are flexed concurrently, bite into the covering part 100b of the optical fiber 100 or each of the extremity ends 65 of the press fitted and held lock claws 56 is widened and released (t3 and t4 in FIG. 10C), respectively. Then, a part of the bent sections 42d, 42e strikes against the inner wall of the rear wall 45 and stops there.

Pulling-out the optical fiber 100 under a state in which the lock claws 56 are released enables the optical fiber 100 to be removed from the case 41.

As described above, the optical fiber fixing device 40 is constituted such that the protrusion 43 for releasing the lock claws 56 is integrally formed with the rear wall 45 of the case 41, the leaf spring 42 is bent toward the abutting part acting as the protrusion 43 at the time of releasing operation to expand the first recess groove 57, thereby it can be released without arranging another releasing member (an operating button for depressing operation) and since there is no wall for preventing another member (the pushing button) from being dropped, it is possible to make its thickness thinner.

In place of arranging the integral one protrusion 43 at the rear wall 45 of the case 41, it is satisfactory that each of concave sections corresponding to the shape of each of the base plate pieces 42a, 42b is formed, respectively, each of the concave sections is made as a slant surface in such a way that the width of the first recess groove 57 is widened in response to the motion of the leaf spring 42 at each of the concave sections, a part of each of the base plate pieces 42a, 42b is engaged with each of the concave sections so as to widen the first recess groove 57.

As described above, the optical fiber fixing device is constructed such that the front wall of the case provided with a cavity is formed with an insertion hole, a movable leaf spring is stored in the cavity, the leaf spring has a through-pass hole and a recess groove recessed to reach the through-pass hole, the circumferential edge of the through-pass hole is formed with a plurality of lock claws, an optical fiber is inserted through the insertion hole and the through-pass hole of the leaf spring, the claws are engaged with the optical fiber, an operating part arranged to deform the recess groove is operated to release an engagement between the optical fiber and the lock claws, thereby when the optical fiber is inserted into the case, it can be smoothly inserted into the case while being abutted against the lock claws having resiliency, its biting and holding of the optical fiber with the lock claws can be carried out and when the optical fiber is released from the case, the operating part is pressed and operated against the recess groove spaced apart from the lock claws, resulting in that the root part of each of the lock claws in the leaf spring is flexed to cause its extremity end to be opened and the optical fiber can be removed from the case.

Further, the recess groove is comprised of a first recess groove and a second recess groove, these first and second recess grooves are arranged oppositely from each other with the through-pass hole being held therebetween, thereby the lock claws of the leaf spring spaced apart from the operating part can be widely flexed at their root portions even with a small amount of flexing caused by depressing the operating part and then the insertion and the pulling-out of the optical fiber in respect to the case can be carried out surely.

Further, the case is provided with the abutting section toward the cavity, the leaf spring is pressed against the abutting section to widen the recess groove, thereby it is not necessary to arrange another member for releasing the fixed state of the optical fiber, it is not required to arrange a configuration for preventing another member from being dropped, it is further possible to make a sufficient thin thickness of the member and then a thinner and smaller-sized configuration can be attained.

In addition, the operating part is comprised of a system in which a part of the leaf spring is fed out of the case, the number of component parts can be reduced and its cost can be reduced.

What is claimed is:

1. An optical fiber fixing device comprising:
   a front wall of a case provided with a cavity formed with an insertion hole;
   a movable leaf spring stored in said cavity and having a through-pass hole and a recess groove recessed to reach said through-pass hole; and a plurality of lock claws formed at the circumferential edge of said through-pass hole;

wherein an optical fiber is inserted through said insertion hole and said through-pass hole of said leaf spring, said lock claws are engaged with said optical fiber, an operating part arranged to deform said recess groove is operated to release an engagement between said optical fiber and said lock claws.

2. An optical fiber fixing device according to claim 1, wherein said recess groove is comprised of a first recess groove and a second recess groove, these first and second recess grooves are oppositely arranged to each other with said through-pass hole being held therebetween.

3. An optical fiber fixing device according to claim 1 or claim 2, wherein said case is provided with an abutting part faced against said cavity, and said leaf spring is pushed against said abutting part to expand said recess groove.

4. An optical fiber fixing device according to claim 1 or claim 2, wherein said operating part is made by feeding a part of said leaf spring out of said case.

5. An optical fiber fixing device according to claim 1 or claim 2, wherein said operating part is comprised of an operating button movably attached to said case.

* * * * *